United States Patent
Scholl et al.

(10) Patent No.: US 8,705,944 B2
(45) Date of Patent: Apr. 22, 2014

(54) SYSTEM AND METHOD OF RECORDING MEDIA CONTENT

(75) Inventors: Thomas Scholl, Parlin, NJ (US); Nina Forsyth, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1322 days.

(21) Appl. No.: 11/825,513

(22) Filed: Jul. 6, 2007

(65) Prior Publication Data
US 2009/0010610 A1 Jan. 8, 2009

(51) Int. Cl.
H04N 5/76 (2006.01)
H04N 5/85 (2006.01)

(52) U.S. Cl.
CPC ...................... H04N 5/85 (2013.01)
USPC ............ 386/295; 386/231; 386/291; 386/292

(58) Field of Classification Search
CPC ....................................... H04N 5/85
USPC .................. 386/225, 231, 290–295
See application file for complete search history.

(56) References Cited

U.S. PATENT DOCUMENTS

| | | | | | |
|---|---|---|---|---|---|
| 6,137,943 | A * | 10/2000 | Kanda | ............................ | 386/235 |
| 6,311,011 | B1 * | 10/2001 | Kuroda | ........................ | 386/297 |
| 7,065,778 | B1 * | 6/2006 | Lu | ..................... | 725/98 |
| 7,623,753 | B2 * | 11/2009 | Farnan et al. | ................. | 386/200 |
| 7,805,741 | B2 * | 9/2010 | Yeh | ................................ | 725/37 |
| 7,814,555 | B2 * | 10/2010 | Iwamoto et al. | ................. | 726/27 |
| 7,877,468 | B2 * | 1/2011 | Abadir et al. | .................. | 709/223 |
| 2002/0118959 | A1 * | 8/2002 | Hayashi | ........................ | 386/125 |
| 2004/0101272 | A1 * | 5/2004 | Boston et al. | .................... | 386/46 |
| 2004/0148551 | A1 * | 7/2004 | Kawahara | ........................ | 714/48 |
| 2004/0163130 | A1 | 8/2004 | Gray et al. | | |
| 2004/0187152 | A1 * | 9/2004 | Francis et al. | .................. | 725/58 |
| 2006/0161635 | A1 * | 7/2006 | Lamkin et al. | ................. | 709/217 |
| 2006/0271687 | A1 | 11/2006 | Alston et al. | | |
| 2008/0046954 | A1 * | 2/2008 | Bhogal et al. | ................. | 725/134 |
| 2010/0005496 | A1 * | 1/2010 | Ellis et al. | ........................ | 725/87 |

OTHER PUBLICATIONS

2Wire.com: MediaScout, Free the Media from Your PC, www.2wire.com, (1 pg).
NDS, NDS Announces Peer-to-Peer Content Sharing and Distributed-DVR Capabilities, Lowering Costs for IPTV Operators, www.nds.com, Jan. 29, 2007, (2 pgs).
J. Walker, O.J. Morris, B. Marusic, Share It!—A Rights-Managed Network of Peer-to-Peer Set-Top-Boxes—System Architecture, NDS UK, Philips UK, University of Ljubljana Slovenia, (9 pgs).

* cited by examiner

*Primary Examiner* — Thai Tran
*Assistant Examiner* — Mishawn Dunn
(74) *Attorney, Agent, or Firm* — Toler Law Group, PC (57) ABSTRACT

Systems and methods for recording media content are provided. A method of recording media content may include receiving a request to schedule recording of media content at a first digital video recording (DVR) device at a customer premises. The method may also include determining availability of the first DVR device to record the media content. The method may further include sending a recording request to a second DVR device at the customer premises to schedule recording of the media content based on the determined availability.

30 Claims, 6 Drawing Sheets

| | Program | Recorded Time | Storage Location | Backup? | Delete After |
|---|---|---|---|---|---|
| 512 | Lost | 1.0 hrs | Bedroom | N | Never |
| 514 | Lost | 1.0 hrs | Livingroom | Y | 1 week |
| 516 | 24 | 45 min | Bedroom | N | 2 weeks |
| 518 | 24 | 1.0 hrs | Network | Y | Verified |
| | American Idol | 1.0 hrs | Livingroom | N | Never |

Column labels: 502, 504, 506, 508, 510

602 — Record "Lost"   Channel 3   8:00 P.M. –9:00 P.M.

604 — ☐ All New Episodes      606 — Keep Until  [Deleted]
608 — ☐ Record Backup Copy    610 — Store At    [Available]

614 — Backup if            [If Primary Copy fails]
616 — Store Backup At      [Remote]
618 — Keep Backup Until    [Primary copy verified]

[Okay] [Cancel]

SYSTEM AND METHOD OF RECORDING MEDIA CONTENT

FIELD OF THE DISCLOSURE

The present disclosure is generally related to a system and method of recording media content.

BACKGROUND

As digital video recording (DVR) devices become more popular, customers may increasingly rely on such DVR devices to record media content for future viewing. Occasionally, requested media content may not be recorded leading to customer frustration. For example, an error at a DVR device may prevent the DVR device from recording the media content. In another example, the DVR device may not have sufficient storage capacity to record the requested media content. Hence, there is a need for an improved system and method for recording media content.

DETAILED DESCRIPTION OF THE DRAWINGS

In a particular embodiment, a system to record media content may include an input to receive a request to schedule recording of media content. The system may also include a scheduling module to identify an available digital video recording (DVR) device of a plurality of DVR devices to record the media content. In an illustrative embodiment, at least one of the plurality of DVR devices is located at a customer premises. The system may also include an output to send a recording request to the available DVR device to schedule recording of the media content.

In a particular embodiment, a system to record media content may include an input to receive a request to schedule recording of a first copy of media content at a scheduled time at a first DVR device at a customer premise. The system may also include a scheduling module to schedule the recording of the first copy of media content at the first DVR device. The system may also include a backup module to send a request to a second DVR device to store a second copy of at least a portion of the media content at the second DVR device.

In a particular embodiment, a method of recording media content may include receiving a request to schedule recording of media content at a first digital video recording (DVR) device at a customer premises. The method may also include determining availability of the first DVR device to record the media content. The method may also include sending a recording request to a second DVR device at the customer premises to schedule recording of the media content based on the determined availability.

In a particular embodiment, a method of recording media content may include receiving, at a master media device at a customer premises, a request to schedule recording of media content. The method may also include scheduling a first recording of the media content at a first DVR device at the customer premises. The method may also include sending data related to the request to a second DVR device to schedule a second recording of the media content at the second DVR device.

In a particular embodiment, a processor readable medium may including instructions executable by a processor. The instructions may include instructions to receive a request to schedule recording of media content at a first DVR device at a customer premises. The instructions may also include instructions to determine availability of the first DVR device to record the media content. The instructions may also include instructions to send a recording request to a second DVR device at the customer premises to schedule recording of the media content.

Figure 1:
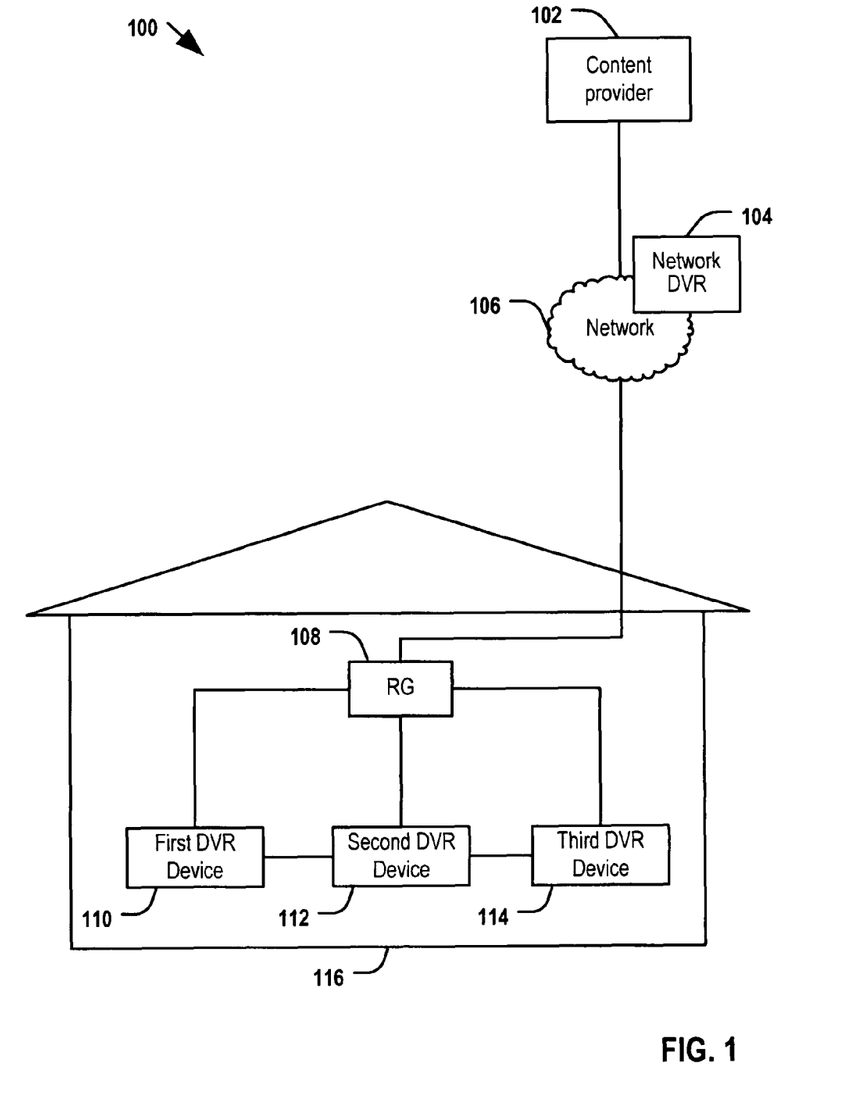
FIG. 1 is a diagram of a first embodiment of a system to record media content.

FIG. 1 is a block diagram of a first embodiment of a system to record media content, generally designated 100. The system 100 includes a content provider 102 coupled to a network 106. For example, the network may include an Internet Protocol Television (IPTV) network. The system 100 also includes a residential gateway (RG) 108 at a customer premises 116 coupled to the network 106. In a particular embodiment, the content provider 102 sends media content, such as movies, television content, music content, and so forth, via the network 106 to the RG 108. The RG 108 distributes the media content to various devices at the customer premises 116, such as a first digital video recording (DVR) device 110, a second DVR device 112, and a third DVR device 114. In a particular embodiment, a network-based DVR (network DVR) device 104 may also be coupled to the network 106.

In a particular embodiment, the RG 108 or one of the DVR devices 110, 112, 114 at the customer residence may act as a master media device to coordinate control of one or more of the other devices. For example, the master media device may receive a listing of media content that is stored at each DVR device 104, 110, 112, 114 and may generate a display that includes a listing of media content available at each of the DVR devices. In another example, the master media device may receive information about recordings scheduled at each of the DVR devices. The master media device may use the scheduled recordings information to identify a DVR device available to record particular media content.

In a particular embodiment, the master media device may receive a request to schedule a recording of media content. The master media device may identify a DVR device available to record the media content, and may send a request to the available DVR device to record the media content. For example, where the RG 108 is the master media device, the RG may store availability information received from the first DVR device 110, the second DVR device 112, the third DVR device 114, the network DVR device 104, or any combination thereof. The RG may use the availability information to select a DVR device, such as the first DVR device 110, to record the media content. The RG 108 may also use other information to select the DVR device, such as ability to access to the requested media, storage capacity, other information about each DVR device or the media content, or any combination thereof.

In a particular embodiment, the master media device may coordinate between the DVR devices to make a backup copy of media content. For example, where the first DVR device 110 acts as the master media device, the first DVR device 110 may select the second DVR device 112 to record a primary copy of the media content. The first DVR device 110 may also select the third DVR device 114 to record a backup copy of the media content. In another example, the first DVR device 110 may select the network DVR device 104 to make the backup copy of the media content.

Figure 2:
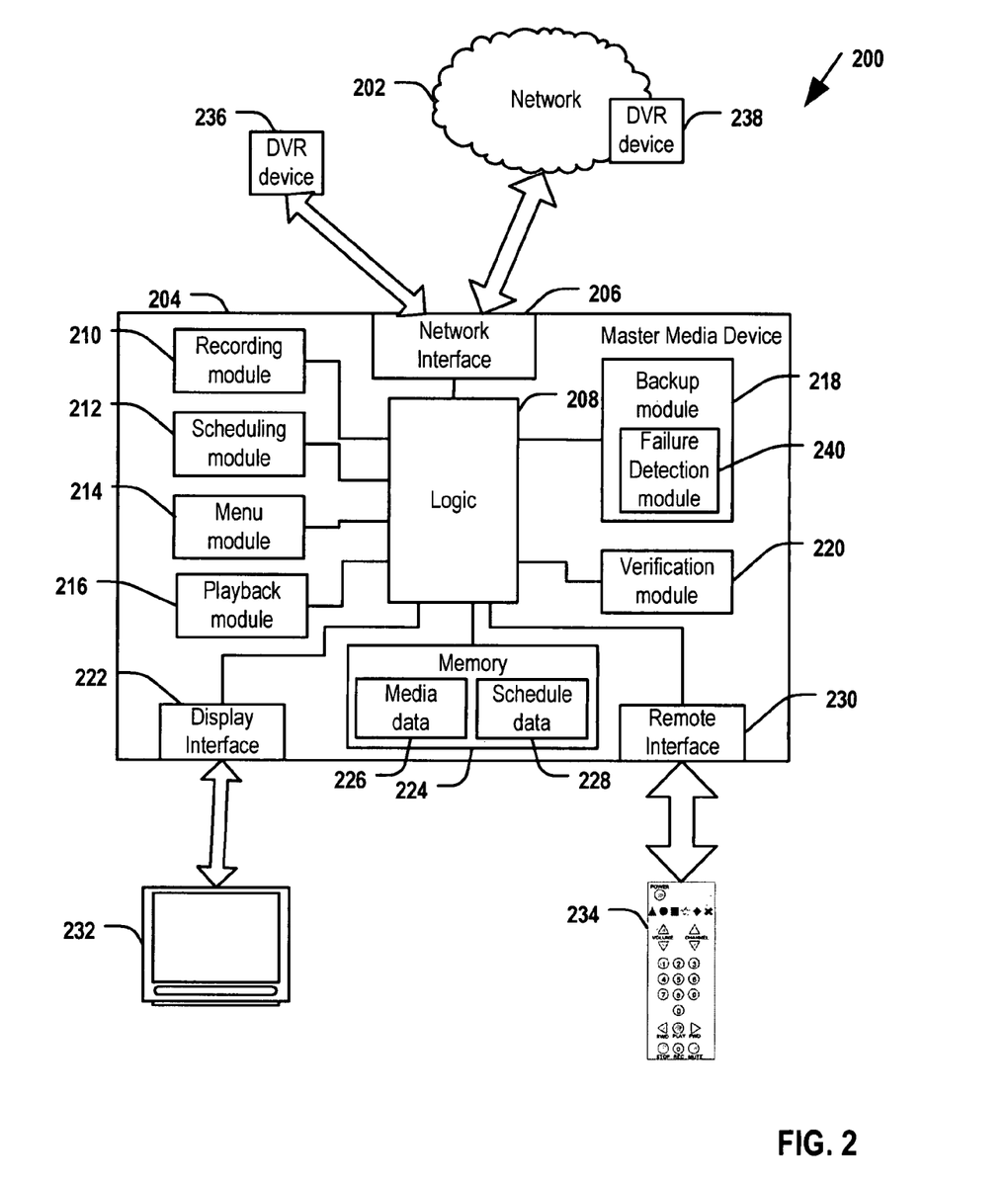
FIG. 2 is a diagram of a second embodiment of a system to record media content.

FIG. 2 is a block diagram of a second embodiment of a system to record media content, generally designated 200. The system 200 includes a network 202 in communication with a master media device 204. In a particular embodiment, the master media device 204 may include a device to receive media content from a content provider via a network, such as a set-top box device; or a device to facilitate communication of media content from a content provider, such as a residential gateway; another media device, such as a digital video recording (DVR) device; or any combination thereof.

The master media device 204 includes an input to receive a request to schedule recording of media content. For example, the master media device 204 may include a remote interface 230 to receive a request to schedule recording of media content from a user via a remote control device 234. In another example, the master media device may include a network interface 206 to receive a request to schedule recording of media content from a local media device, such as DVR device 236, via a local area network; or from a remote media device, such as network DVR device 238, via a wide area network.

In a particular embodiment, the master media device 204 may include a scheduling module 212 to identify an available DVR device. To illustrate, the master media device 204 may be coupled to one or more DVR devices via one or more local area networks, one or more wide area networks, or any combination thereof. For example, the master media device 204 may be coupled to the local DVR device 236, one or more additional local DVR devices (not shown), the network DVR device 238, or any combination thereof. In a particular illustrative embodiment, at least one DVR device coupled to the master media device 204 is located at a customer premises. The scheduling module 212 may determine which of the DVR devices is available to record the requested media content. For example, the scheduling module 212 may access schedule data 238 stored in a memory 224 of the master media device. The schedule data 238 may include information about the availability of each of the DVR devices, such as recordings that are already scheduled to take place, channels or media content the DVR device is able to access, other information relevant to determining whether the DVR device is available to record particular media content, or any combination thereof. The scheduling module 212 may send a request to record the media content to the identified available DVR device. In a particular embodiment, the scheduling module 212 may each be implemented in hardware, software instructions executable by the logic 208, or any combination thereof.

In a particular embodiment, the master media device 204 may be a master DVR device and one or more of the DVR devices 236 and 238 may be a slave DVR device. In a particular illustrative embodiment, the master DVR device may be located at the customer premises. For example, the master media device 204 may itself be a DVR device adapted to store media data 226 in the memory 224 using a recording module 210. In a particular embodiment, the slave DVR devices (e.g., DVR devices 236 and 238) may send schedule information to the master DVR device so that the scheduling module 212 may identify a DVR device that is available to record particular media content and send a recording request to the available slave DVR device based on the availability information. In a particular embodiment, at least one of the slave DVR devices, such as the DVR device 236, is located at the customer premises. The master media device 204 may also include an output (such as the network interface 206) to send a recording request to the available DVR device to schedule recording of the media content.

In a particular embodiment, the master media device 204 may also include a menu module 214. The menu module 214 may generate a list of stored media content based at least partially on data received from the DVR devices 236, 238. For example, the master media device 204 may receive data regarding media content stored at the local DVR device 236, at the network DVR device 238, at the memory 224, or any combination thereof. The menu module 214 may access the data regarding the stored media content and generate a menu of available media content for display at a display device 232 via a display interface 222. In a particular embodiment, the menu module 214 may be implemented in hardware, software instructions executable by the logic 208, or any combination thereof.

In a particular embodiment, the scheduling module 212 may identify a second available DVR device, such as local DVR device 236 or network DVR device 238, to create a backup copy of the media content. Thus, the first available DVR device may create a primary copy of the media content, and the second available DVR device may create a backup copy of at least a portion of the media content. For example, after the scheduling module 212 has selected a second available DVR device, a backup module 218 may send a backup request via the output to the second available DVR devices. The backup request may include instructions to generate a backup recording of the media content. In a particular embodiment, the backup request may include instructions for deleting the backup copy of the media content. For example, the backup request may include a time limit for storing the backup copy. The time limit for storing the backup copy may be different than a time limit assigned for storing the primary copy of the media content. In a particular embodiment, the backup module 218 may be implemented in hardware, software instructions executable by the logic 208, or any combination thereof.

In another example, the backup request may indicate that the backup copy of the media content should be deleted after the primary copy of the media content has been verified. That is, a verification module 220 may determine whether the primary copy of the media content has been successfully recorded. The verification module 220 may use a checksum, another verification technique, or any combination thereof to determine whether the recorded media content in the primary copy of the media content is complete. If the verification module 220 determines that the primary copy of the media content is complete, the backup copy of the media content may be deleted. In a particular embodiment, the verification module 220 may be implemented in hardware, software instructions executable by the logic 208, or any combination thereof.

If the primary copy is not complete, the verification module 220 may determine whether the backup copy is complete. If the backup copy is complete, the backup copy may be sent from the second available DVR device to the first available DVR device as a replacement for the primary copy. In another embodiment, the primary copy and the backup copy may be merged to create a complete copy of the media content. For example, the backup module 218 may combine the primary copy and the backup copy to create a complete copy of the media content stored at the first available DVR device. In another example, a playback module 216 may read the primary copy of the media content during playback, and may fill in missing portions of the primary copy during playback from the backup copy of the media content. In a particular embodiment, the playback module 216 may be implemented in hardware, software instructions executable by the logic 208, or any combination thereof.

In a particular embodiment, the second available DVR device may make a backup copy of the entire media content. That is, the backup copy may include the same content as the primary copy. Thus, the second available DVR device may make the backup copy in response to receiving the request to schedule the recording. In another particular embodiment, the second available DVR device may only record a backup copy of the media content after detection of an error. For example, if the first available DVR device fails during recording of the primary copy of the media content, a failure detection module 240 may detect the failure and initiate recording of the backup copy of the media content at the second available DVR device. In a particular embodiment, the failure detection module 240 may be implemented in hardware, software instructions executable by the logic 208, or any combination thereof.

Figure 3:
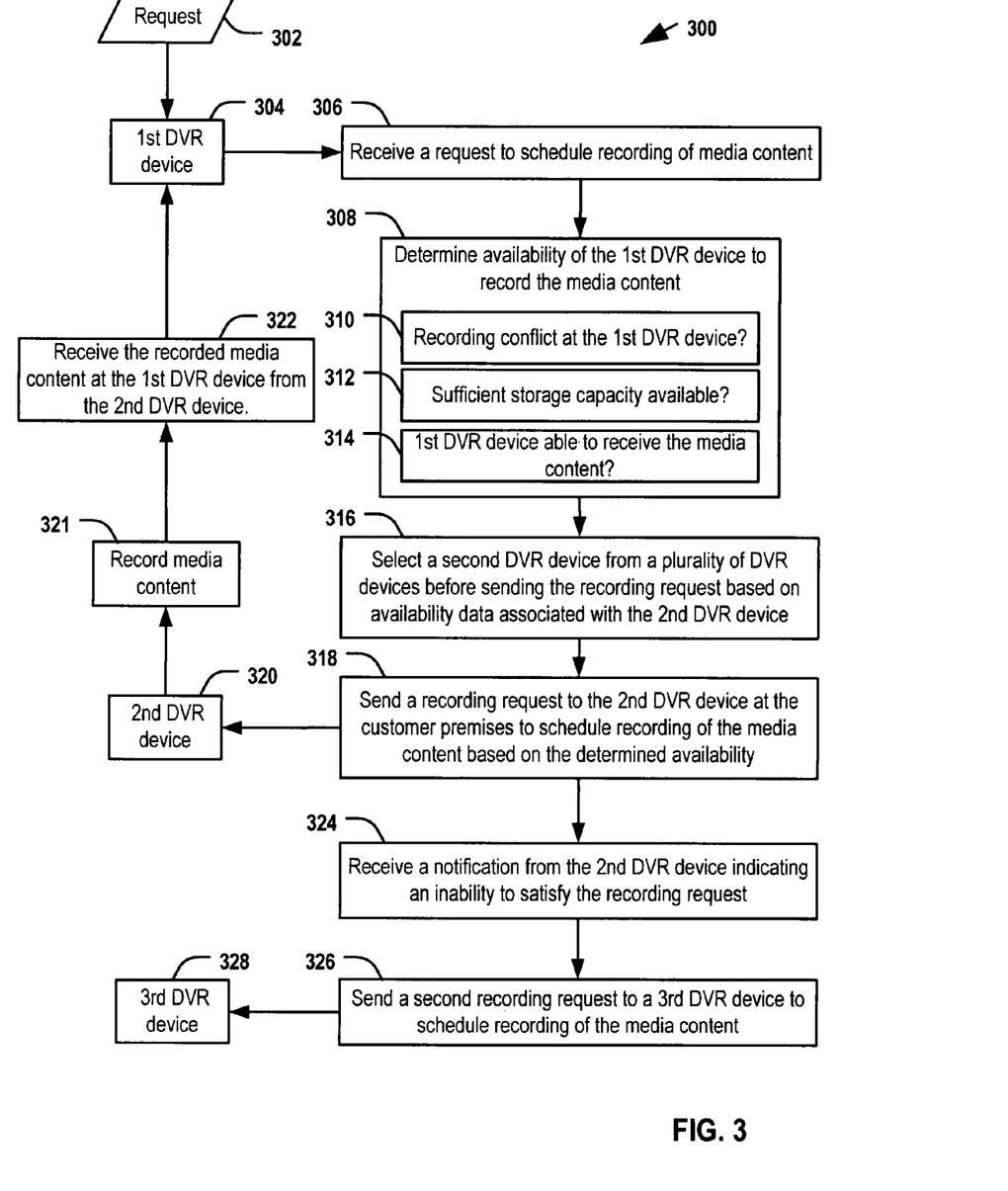
FIG. 3 is a flow chart of a first embodiment of a method of recording media content.

FIG. 3 is a flow chart of a first embodiment of a method of recording media content, generally designated 300. The method 300 includes, at 306, receiving a request 302 to schedule recording of media content at a first digital video recording (DVR) device 304 at a customer premises. The method 300 also includes, at 308, determining availability of the first DVR device 304 to record the media content. Determining the availability of the first DVR device 304, may include, at 310, determining whether a recording conflict exists at the first DVR device. Determining the availability of the first DVR device 304, may include, at 312, determining whether storage capacity available at the first DVR device is sufficient to store the media content. Determining the availability of the first DVR device 304, may include, at 314, determining whether the first DVR device is able to receive the media content.

In a particular embodiment, the method 300 may include, at 316, selecting a second DVR device 320 from a plurality of DVR devices based on availability data associated with the second DVR device. The method 300 may also include, at 318, sending a recording request to the second DVR device 320 at the customer premises to schedule recording of the media content. For example, the first DVR device 304 may be a master DVR device and the second DVR device 320 may be a slave DVR device. Thus, when the first DVR device 304 is not available to record the media content, it may identify whether another DVR device among a plurality of slave DVR devices is available, and command the available DVR device to record the media content. The plurality of slave DVR devices may include one or more local DVR devices at a customers premises, one or more remote DVR devices at network, or any combination thereof.

In a particular embodiment, the second DVR device 320 may record the media content, at 321, after receiving the recording request. The method may also include, at 322, receiving the recorded media content at the first DVR device 304 from the second DVR device 320. For example, after recording the media content, the second DVR device 320 may schedule a transfer of the media content from the second DVR device 320 to the first DVR device 304 since the original request 302 to record the media content was received at the first DVR device 304. In another example, a customer may request playback of the media content at the first DVR device 304, and, in response to the playback request, the first DVR device 304 may access the recorded media content at the second DVR device 320.

In a particular embodiment, the method 300 may include, at 324, receiving a notification from the second DVR device 320 indicating an inability to satisfy the recording request. For example, the second DVR device 320 may not have sufficient memory capacity available to record the media content, the second DVR device 320 may not be able to access the media content, the second DVR device 320 may have experienced an error, or the second DVR device 320 may not be able to record the media content for some other reason. In a particular embodiment, the method 300 may include, at 326, sending a second recording request to a third DVR device 328 to schedule recording of the media content.

Figure 4:
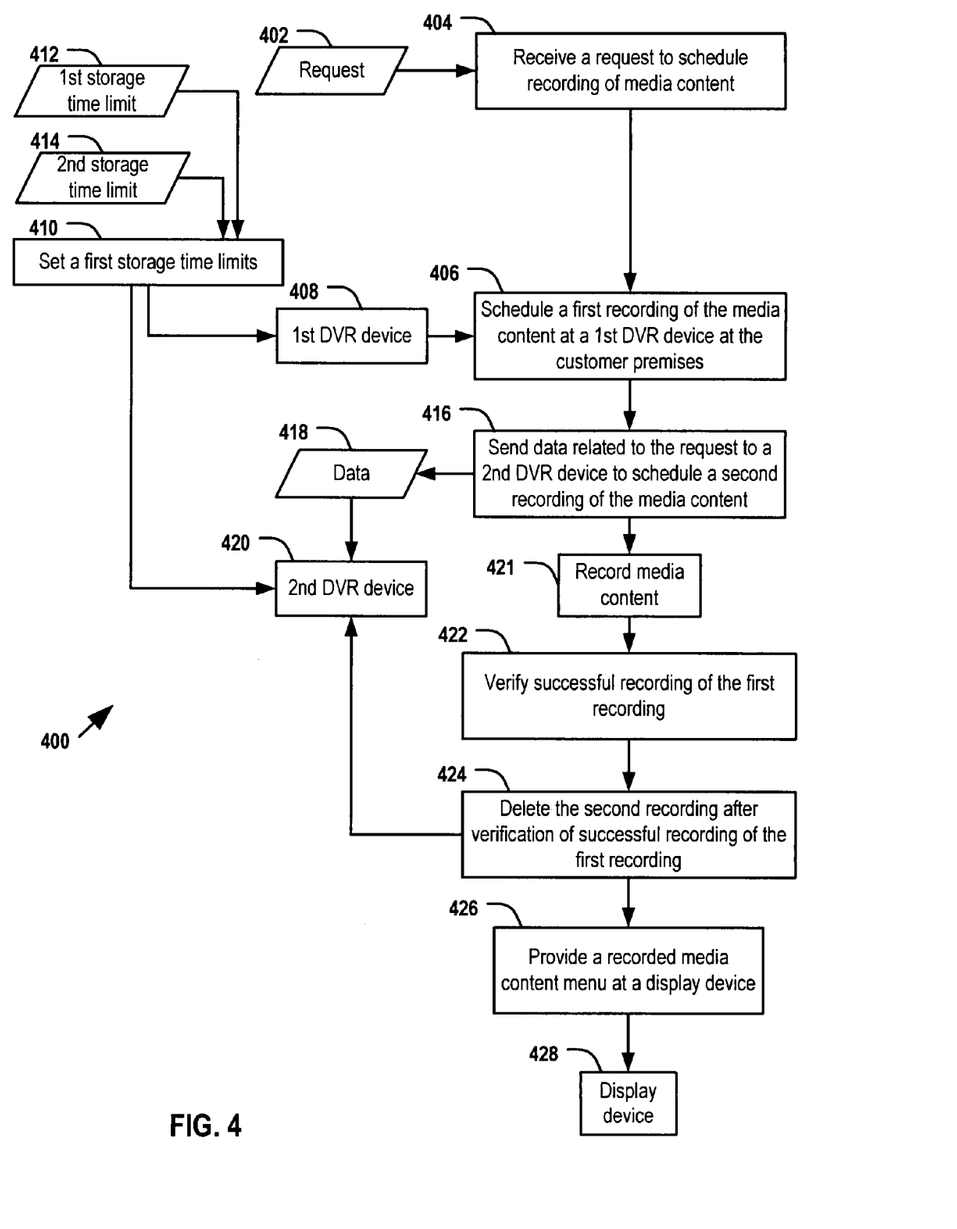
FIG. 4 is a flow chart of a second embodiment of a method of recording media content.

FIG. 4 is a flow chart of a second embodiment of a method of recording media content, generally designated 400. The method 400 may include, at 404, receiving, at a master media device at a customer premises, a request 402 to schedule recording of media content. The master media device may include a set-top box device, a residential gateway, a digital video recording (DVR) device, or another device adapted to receive media content, or facilitate communication of media content.

In a particular embodiment, the method 400 may also include, at 406, scheduling a first recording of the media content at a first DVR device 408. The master media device may include the first DVR device 408, or the first DVR device 408 may be separate from the master media device. In a particular embodiment, the first DVR device 408 may be located at the customer premises. For example, the first DVR device 408 may include a DVR device coupled to the master media device via a local area network.

In another example, the first DVR device 408 may include a network DVR device coupled to the master media device via a wide area network In a particular embodiment, the method 400 may also include, at 416, sending data 418 related to the request to a second DVR device 420 to schedule a second recording of the media content at the second DVR device 420. In a particular embodiment, the second DVR device 420 may be located at the customer premises, or remote from the customer premises. For example, the second DVR device 420 may include a DVR device coupled to the master media device via a local area network. In another example, the second DVR device 420 may include a network-based DVR device coupled to the master media device via a wide area network. In a particular embodiment, the first DVR device 408 and/or the second DVR device 420 may record the media content, at 421.

In a particular embodiment, the method 400 may include, at 410, setting a first storage time limit 412 associated with the first recording at the first DVR device 408 and a second storage time limit 414 associated with the second recording at the second DVR device 420. In an illustrative embodiment, the first storage time limit 412 and the second storage time limit 414 are different. For example, the first storage time limit 412 may specify an indefinite time limit, such as until deleted by a user, and the second storage time limit 414 may specify a definite time limit, such as a number of hours, days, weeks, and so forth. In another example, the first storage time limit 412 and second storage time limit 414 may each specify a different definite time limit. In another example, the first storage time limit 412 and second storage time limit 414 may each specify a different indefinite time limit.

To illustrate, the second storage time limit 414 may indicate that the second copy of the media content at the second DVR device 420 should be stored until the first copy of the media content at the first DVR device 408 can be verified to be complete. Thus, the method 400 may include, at 422, verifying successful recording of the first copy of the media content at the first DVR device 408. The method 400, may also include, at 424, deleting the second copy of the media content at the second DVR device after verification of successful recording of the first copy.

The method 400 may also include, at 426, providing a recorded media content menu at a display device 428. The recorded media content menu may include one or more selectable items related to recorded media content stored at the first DVR device 408 and one or more selectable items related to recorded media content stored at the second DVR device 420.

Figure 5:
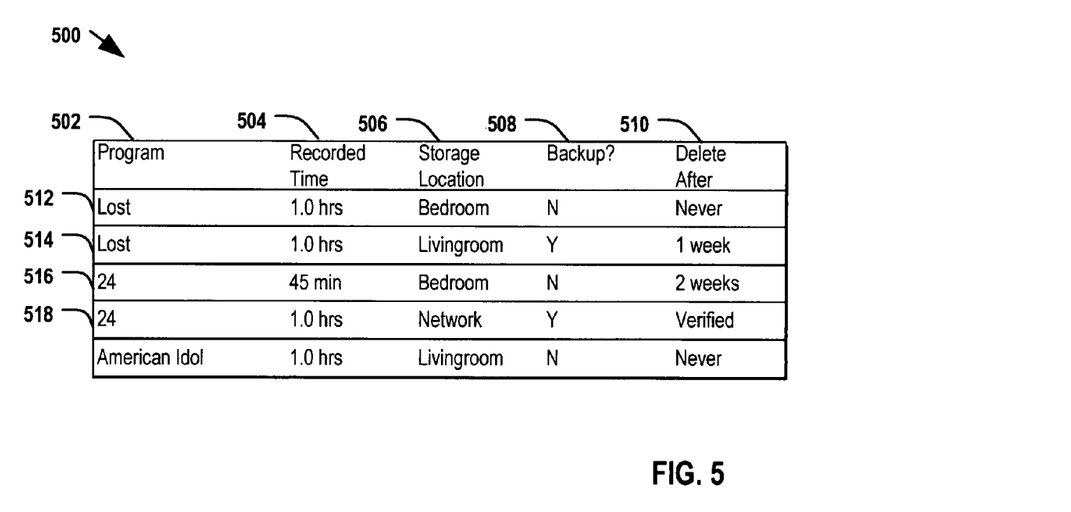
FIG. 5 is a diagram illustrating a user interface display to record media content.

FIG. 5 is a drawing illustrating a user interface display to record media content, generally designated 500. The display 500 includes a menu of media content stored at several DVR devices. In a particular embodiment, the display 500 may be generated by a master media device based on data gathered from one or more slave devices. The display 500 identifies the name of each recorded program at "Program" column 502. The display 500 specifies the recorded length of each program at "Recorded Time" column 504. The display 500 specifies the storage location of each program at "Storage Location" column 506. The display 500 specifies whether each program is a backup copy or not at "Backup?" column 508. The display 500 specifies the storage time limit of each program at "Delete After" column 510. In various embodiments, the display 500 may include more or fewer columns.

To illustrate the operation of the system, the display 500 includes several possible variations. For example, the display 500 includes information related to a primary copy of "Lost" 512, and information related to a backup copy of "Lost" 514. The primary copy 512 is stored at a bedroom DVR device, while the backup copy 514 is stored at a living room DVR device. Additionally, the primary copy 512 includes an indefinite storage time limit of "Never," indicating that the primary copy of "Lost" 512 should not be deleted automatically, but rather, should only be deleted in response to a deletion command from a user. The backup copy of "Lost" 514 includes a storage time limit of 1 week, indicating that the backup copy 514 should be deleted 1 week from when it was stored.

The display also includes information related to a primary copy of "24" 516, and information related to a backup copy of "24" 518. The primary copy 516 is stored at a bedroom DVR device and the backup copy 518 is stored at a network DVR device (i.e., a DVR device remote from the customer's premises). The primary copy 516 includes a definite storage time limit of 2 weeks, whereas the backup copy 518 includes an indefinite storage time limit of "verified". The "verified" time limit indicates that the backup copy 518 should be stored until the primary copy 516 has been verified to be complete. In the case illustrated, the primary copy 516 indicates a recorded time of 45 minutes, while the backup copy indicates a recorded time of 1 hour. Thus, the primary copy 516 may be incomplete. In a particular embodiment, the backup copy 518 may be copied to the storage location of the primary copy 516 (in this case, the bedroom DVR device) to replace the incomplete primary copy 516. In another particular embodiment, if a user requests playback of the primary copy 516, the bedroom DVR device (or another device from which the playback request was received) may access the backup copy 518 either to playback the entire program, or to supplement the primary copy 516 during playback.

Figure 6:
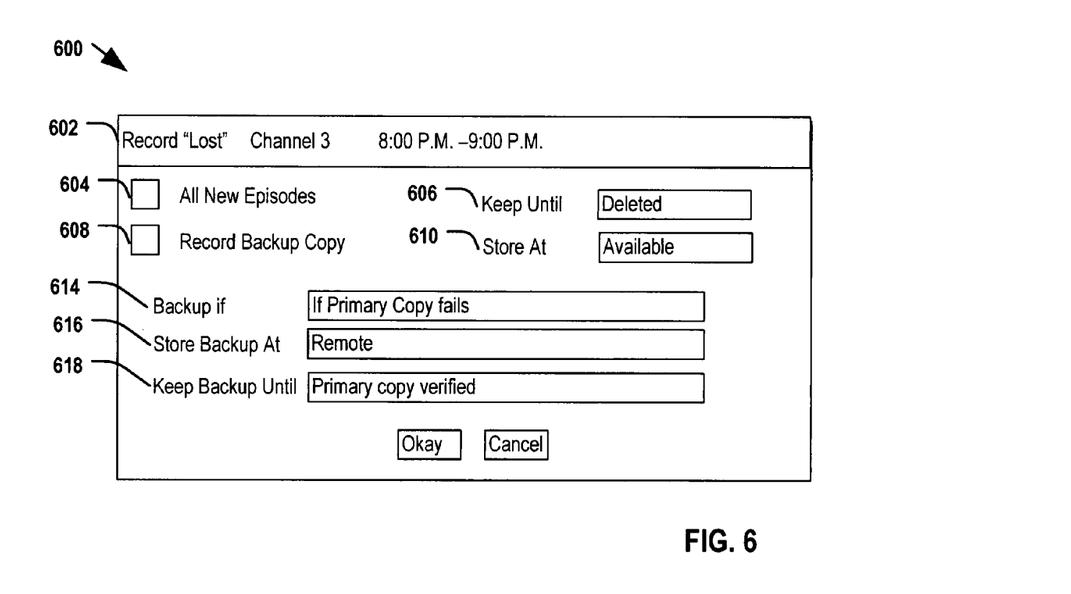
FIG. 6 is a diagram illustrating a user interface display to record media content.

FIG. 6 is a drawing illustrating a user interface display to record media content, generally designated 600. As illustrated, the display pertains to a particular program, "Lost" at a particular time, between 8:00 p.m. and 9:00 p.m., on a particular channel, "Channel 3," as indicated by heading 602. In an illustrative embodiment, the display 600 includes a number of user selectable elements that may be used to configure a request to record media content (e.g., to make a primary copy of the media content). Additionally, the display 600 may include a number of user selectable elements that may be used to configure a request to record a second copy of the media content (e.g., to make a backup copy of the media content).

As depicted, the display 600 includes options to specify recording of a primary copy of the media content. For example, the display includes an all new episodes element 604 indicating a user selectable option to schedule recording of each new episode of the program. The display 600 also includes a keep until element 606 indicating a user selectable option to set a storage time limit for the primary copy of the media content. In an illustrative embodiment, the keep until element 606 may allow the user to choose between several definite or indefinite time limits. For example, the definite time limits may include a determined number of minutes, hours, days, weeks and so forth. In another example, the indefinite time limits may indicate that the primary copy should be retained until deleted by a user, or for some other indefinite time period.

In a particular embodiment, the display 600 includes a store at element 610 indicating a user selectable option to indicate where the primary copy should be stored. In an illustrative embodiment, the store at element 610 may allow the user to select to store the primary copy at an unspecified local device (e.g., any available device), at a specific local device, or at a remote device, such as a network DVR device.

The display 600 includes record backup copy element 608 indicating a user selectable option to request that a backup copy of the program be stored. If the record backup copy element 608 is selected, options to configure the recording and storage of the backup copy may be made available to the user. In a particular embodiment, the display 600 may include a backup if element 614 indicating a user selectable option to indicate when a backup copy should be stored. In an illustrative embodiment, the backup if element 614 may allow the user to select to create a backup copy only if a failure of the primary copy is detected, or always (e.g., regardless of whether a failure of the primary copy is detected).

In a particular embodiment, the display 600 includes a store backup at element 616 indicating a user selectable option to indicate where the backup copy should be stored. In an illustrative embodiment, the store backup at element 616 may allow the user to select to store the backup copy at an unspecified local device, at a specific local device, or at a remote device, such as a network DVR device.

In a particular embodiment, the display 600 includes a keep backup until element 618 indicating a user selectable option to set a storage time limit for the backup copy of the media content. In an illustrative embodiment, the keep backup until element 618 may allow the user to choose between several definite or indefinite time limits. For example, the definite time limits may include a determined number of minutes, hours, days, weeks and so forth. In another example, the indefinite time limits may indicate that the backup copy should be retained until deleted by a user, until the primary copy is verified, or some other indefinite time period.

In conjunction with the configuration of structure described herein, the systems and methods disclosed record media content. In a particular illustrative embodiment, a master media device receives a request to schedule recording of media content. The master media device determines availability of a plurality of digital video recording (DVR) devices and selects a first DVR device to record the media content. The master media device sends a recording request to the first DVR device. The master media device may also send a backup request to a second DVR device. Thus, a plurality of DVR devices may be used collectively to ensure that media content is recorded and to improve the reliability of recording the media content. The plurality of DVR devices may include DVR devices in a customer's premises that communicate via a local area network, network-based DVR devices that communicate via a wide area network, or any combination thereof.

Figure 7:
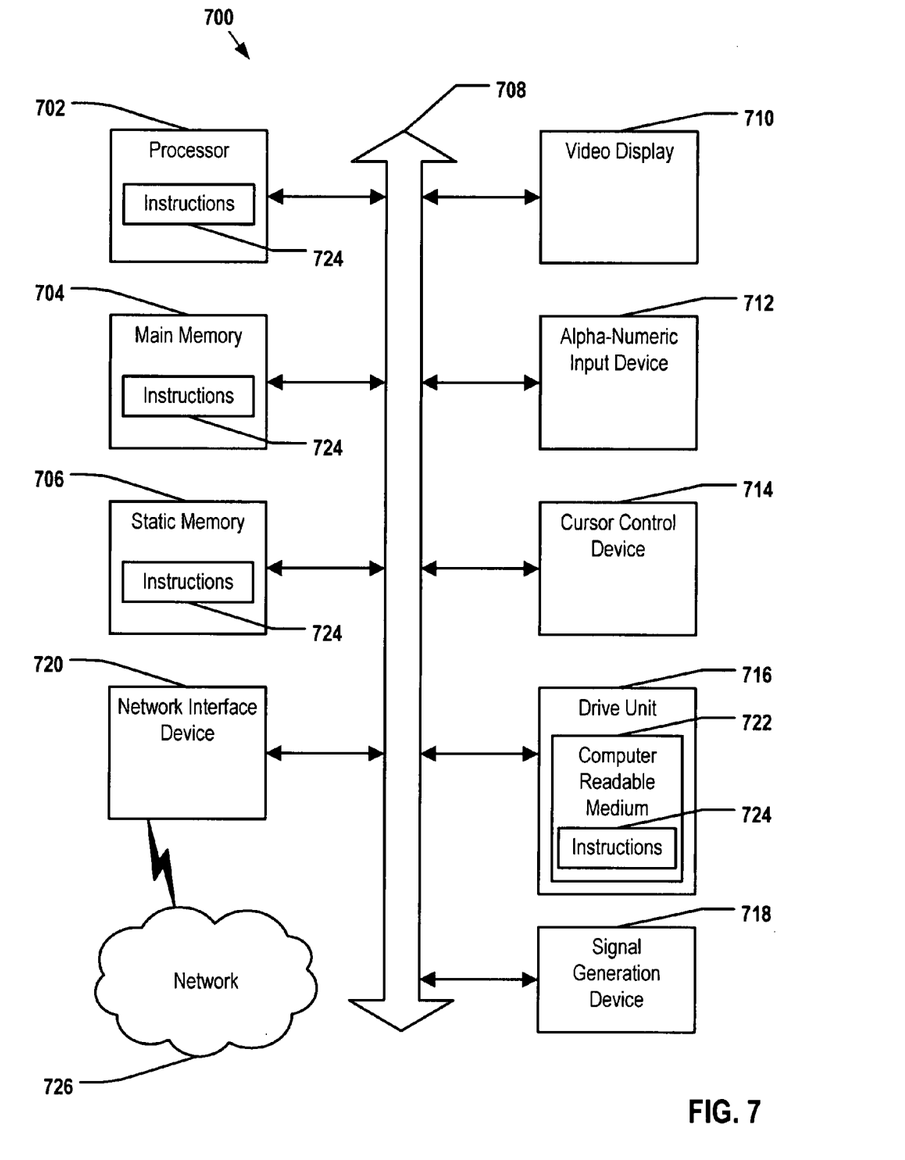
FIG. 7 is a block diagram of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. In a particular embodiment, the computer system 700 may include, or be included in any one or more of the DVRs, residential gateways, master media devices depicted in FIGS. 1, 2, 3 and 4.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706, that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a first digital video recorder device at a customer premises, a request to schedule a recording of media content and to schedule recordation of a backup recording of the media content, wherein the request is received prior to a scheduled start time associated with the media content;
   prior to the scheduled start time associated with the media content:
      determining, at the first digital video recorder device, availability of the first digital video recorder device to record the media content;
      sending a first recording request from the first digital video recorder device to a second digital video recorder device at the customer premises to schedule recordation of the recording based on determined availability of the first digital video recorder device to record the media content; and
      sending a second recording request from the first digital video recorder device to a third digital video recorder device to schedule recordation of the backup recording based on determined availability of the first digital video recorder device to record the media content; and
   automatically deleting, via the first digital video recorder device, the backup recording upon verification that the recording is successfully completed.

2. The method of claim 1, further comprising receiving the recording at the first digital video recorder device from the second digital video recorder device after the second digital video recorder device records the media content.

3. The method of claim 1, further comprising:
   receiving a notification from the second digital video recorder device indicating that the recording is a partial recording; and
   sending a request to the third digital video recorder device to provide at least a portion of the backup recording of the media content to the second digital video recorder device, wherein the second digital video recorder device generates a full recording of the media content based on the partial recording and the at least a portion of the backup recording.

4. The method of claim 1, wherein determining the availability of the first digital video recorder device comprises determining whether the first digital video recorder is already scheduled to record other media content during a scheduled play time of the media content.

5. The method of claim 1, wherein determining the availability of the first digital video recorder device comprises determining whether storage capacity available at the first digital video recorder device is sufficient to store the media content.

6. The method of claim 1, wherein determining the availability of the first digital video recorder device comprises determining whether the first digital video recorder device is able to access the media content.

7. The method of claim 1, further comprising selecting the second digital video recorder device from a plurality of digital video recorder devices before sending the first recording request based on availability data associated with the second digital video recorder device.

8. The method of claim 1, wherein the third digital video recorder device is a network digital video recorder device.

9. The method of claim 1, wherein the third digital video recorder device is located at the customer premises.

10. A processor-readable storage device including instructions that, when executed by a processor, cause the processor to perform operations comprising:
    receiving a request to schedule a first digital video recorder device at a customer premises to record a recording of media content;
    determining availability of the first digital video recorder device to record the media content;
    sending a first recording request to a second digital video recorder device at the customer premises to schedule recordation of the recording based on availability of the first digital recording device to record the media content;
    detecting a failure of the second digital video recorder device to record the media content;

sending a second recording request to start a backup recording of the media content at a third digital video recorder device in response to detection of the failure; and displaying the media content at a display device as displayed media content, wherein at least a portion of the displayed media content is generated based on the recording, and wherein at least another portion of the displayed media content is generated based on the backup recording.

11. The processor-readable storage device of claim 10, wherein the third digital video recorder device is a network digital video recorder device, and wherein the third digital video recorder device is located external to the customer premises.

12. The processor-readable storage device of claim 10, wherein the request assigns a first storage time limit to the recording.

13. The processor-readable storage device of claim 10, wherein the processor is a component of a set-top box device.

14. The processor-readable storage device of claim 10, wherein detecting the failure of the second digital video recorder device to record the media content comprises receiving a notification from the second digital video recorder device indicating that the recording is a partial recording.

15. The processor-readable storage device of claim 10, wherein determining the availability of the first digital video recorder device to record the media content comprises determining whether the first digital video recorder is scheduled to record other media content during a scheduled play time of the media content.

16. The processor-readable storage device of claim 10, wherein determining the availability of the first digital video recorder device to record the media content comprises determining whether storage capacity available at the first digital video recorder device is sufficient to store the media content.

17. The processor-readable storage device of claim 10, wherein determining the availability of the first digital video recorder device to record the media content comprises determining whether the first digital video recorder device is able to access the media content.

18. A method comprising:
receiving, at a first digital video recorder device at a customer premises, a request to schedule a recording of media content;
determining, via a processor of the first digital video recorder device, availability of the first digital video recorder device to record the media content;
sending, from the first digital video recorder device to a second digital video recorder device at the customer premises, a first recording request to schedule recordation of the recording based on availability of the first digital video recorder device to record the media content;
detecting a failure of the second digital video recorder device to record the media content;
sending a second recording request to start a backup recording of the media content at a third digital video recorder device in response to detection of the failure; and
displaying the media content at a display device as displayed media content, wherein at least a portion of the displayed media content is generated based on the recording, and wherein at least another portion of the displayed media content is generated based on the backup recording.

19. The method of claim 18, wherein the third digital video recorder device is a network digital video recorder device.

20. The method of claim 18, wherein the third digital video recorder device is located at the customer premises.

21. The method of claim 18, wherein the first digital video recorder device is part of a set-top box device.

22. A digital video recorder device comprising:
a processor;
a memory accessible to the processor, the memory comprising instructions executable by the processor to perform operations including:
receiving a request to schedule recording of media content at a customer premises;
determining availability of the digital video recorder device to record the media content;
sending a first recording request to a second digital video recorder device at the customer premises to schedule recordation of the recording based on availability of the digital recording device to record the media content;
detecting a failure of the second digital video recorder device to record the media content;
sending a second recording request to start a backup recording of the media content at a third digital video recorder device in response to detection of the failure; and
displaying the media content at a display device as displayed media content, wherein at least a portion of the displayed media content is generated based on the recording, and wherein at least another portion of the displayed media content is generated based on the backup recording.

23. The digital video recorder device of claim 22, wherein the third digital video recorder device is a network digital video recorder device.

24. The digital video recorder device of claim 22, wherein the third digital video recorder device is located at the customer premises.

25. A computer-readable storage device including instructions that, when executed by a processor, cause the processor to perform operations comprising:
receiving a request to schedule a first digital video recorder device at a customer premises to record a recording of media content and to schedule recordation of a backup recording of the media content, wherein the request is received prior to a scheduled start time associated with the media content;
determining availability of the first digital video recorder device to record the media content prior to the scheduled start time associated with the media content;
sending, prior to the scheduled start time associated with the media content, a first recording request to a second digital video recorder device at the customer premises to schedule recordation of the recording based on determined availability of the first digital video recorder device to record the media content;
sending, prior to the scheduled start time associated with the media content, a second recording request to a third digital video recorder device to schedule recordation of the backup recording based on determined availability of the first digital video recorder device to record the media content; and
automatically deleting the backup recording upon verification that the recording is successfully completed.

26. The computer-readable storage device of claim 25, wherein the operations further include receiving the recording at the first digital video recorder device from the second digital video recorder device after the second digital video recorder device records the media content.

27. The computer-readable storage device of claim 25, wherein the operations further include:
- receiving a notification from the second digital video recorder device indicating that the recording is a partial recording; and
- sending a request to the third digital video recorder device to provide a portion of the backup recording of the media content to the second digital video recorder device, wherein the second digital video recorder device generates a full recording of the media content based on the partial recording and the at least a portion of the backup recording.

28. The computer-readable storage device of claim 25, wherein determining the availability of the first digital video recorder device to record the media content comprises determining whether the first digital video recorder is scheduled to record other media content during a scheduled play time of the media content.

29. The computer-readable storage device of claim 25, wherein determining the availability of the first digital video recorder device to record the media content comprises determining whether storage capacity available at the first digital video recorder device is sufficient to store the media content.

30. The computer-readable storage device of claim 25, wherein determining the availability of the first digital video recorder device to record the media content comprises determining whether the first digital video recorder device is able to access the media content.

* * * * *